United States Patent
Daley et al.

(10) Patent No.: US 7,590,143 B2
(45) Date of Patent: Sep. 15, 2009

(54) SYSTEM AND METHOD FOR VOICE OVER IP

(75) Inventors: Robert S. Daley, Del Mar, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 09/900,559

(22) Filed: Jul. 5, 2001

(65) Prior Publication Data

US 2003/0007469 A1 Jan. 9, 2003

(51) Int. Cl.
H04B 7/216 (2006.01)
H04L 12/66 (2006.01)

(52) U.S. Cl. .................. 370/466; 370/342; 370/335; 370/401; 370/352

(58) Field of Classification Search ......... 370/310–350, 370/352, 401, 466–477
See application file for complete search history.

(56) References Cited

U.S. PATENT DOCUMENTS

| | | | |
|---|---|---|---|
| 5,953,322 A | 9/1999 | Kimball | |
| 6,252,862 B1 * | 6/2001 | Sauer et al. | 370/331 |
| 6,320,873 B1 * | 11/2001 | Nevo et al. | 370/466 |
| 6,392,999 B1 * | 5/2002 | Liu et al. | 370/260 |
| 6,434,139 B1 * | 8/2002 | Liu et al. | 370/352 |
| 6,434,191 B1 | 8/2002 | Agrawal et al. | |
| 6,434,391 B1 * | 8/2002 | Rutan et al. | 455/452.1 |
| 6,493,551 B1 * | 12/2002 | Wang et al. | 455/432.1 |
| 6,526,033 B1 * | 2/2003 | Wang et al. | 370/338 |
| 6,668,173 B2 * | 12/2003 | Greene | 455/445 |
| 6,687,243 B1 * | 2/2004 | Sayers et al. | 370/356 |
| 6,775,285 B1 * | 8/2004 | Moles et al. | 370/392 |
| 6,791,974 B1 * | 9/2004 | Greenberg | 370/352 |
| 6,795,708 B1 * | 9/2004 | Patel | 455/450 |
| 6,839,356 B2 * | 1/2005 | Barany et al. | 370/401 |
| 6,845,092 B2 * | 1/2005 | Vassilovski et al. | 370/342 |
| 6,888,803 B1 * | 5/2005 | Gentry et al. | 370/259 |
| 6,912,230 B1 * | 6/2005 | Salkini et al. | 370/466 |
| 6,963,582 B1 * | 11/2005 | Xu | 370/466 |
| 6,967,938 B1 * | 11/2005 | Kang et al. | 370/335 |
| 7,058,033 B1 * | 6/2006 | Dantu et al. | 370/331 |
| 7,058,076 B1 * | 6/2006 | Jiang | 370/465 |
| 7,085,260 B2 * | 8/2006 | Karaul et al. | 370/352 |
| 2001/0001268 A1 * | 5/2001 | Menon et al. | 370/329 |

(Continued)

OTHER PUBLICATIONS

Title: "Yes 2 3G" Wite Paper, Mobile ifestreams, www.mobile3G.com, Feb. 2001, pp. 27.*

(Continued)

Primary Examiner—Chi H Pham
Assistant Examiner—Ahmed Elallam
(74) Attorney, Agent, or Firm—Sandip (Micky) S. Minhas; Darren M. Simon (57) ABSTRACT

A wireless telephone without IP capability nonetheless communicates with an infrastructure that uses IP. An infrastructure component assigns the wireless telephone a temporary EP address based on the location of the telephone, and then transforms over-the-air (OTA) voice protocol packets, such as IS-95 packets, from the wireless telephone to IP packets. The IP packets are sent through the infrastructure to another communication device. In turn, IP packets representing voice communication from the communication device are sent through the infrastructure, transformed to OTA packets, and transmitted to the wireless telephone.

45 Claims, 4 Drawing Sheets

U.S. PATENT DOCUMENTS

| | | |
|---|---|---|
| 2001/0015968 A1 | 8/2001 | Sicher et al. |
| 2001/0018346 A1 | 8/2001 | Okajima et al. |
| 2001/0030955 A1 | 10/2001 | Lee et al. |
| 2001/0036172 A1 | 11/2001 | Haskal |
| 2001/0036816 A1 | 11/2001 | Wieck |
| 2001/0038616 A1* | 11/2001 | Fong et al. .................. 370/329 |
| 2001/0039197 A1 | 11/2001 | Barkan |
| 2001/0043577 A1* | 11/2001 | Barany et al. ............... 370/328 |
| 2002/0024943 A1* | 2/2002 | Karaul et al. ............... 370/338 |
| 2002/0035699 A1* | 3/2002 | Crosbie ...................... 713/201 |
| 2002/0048268 A1* | 4/2002 | Menon et al. ............... 370/349 |
| 2002/0057657 A1 | 5/2002 | La Porta et al. |
| 2002/0059449 A1 | 5/2002 | Wandel et al. |
| 2002/0064182 A1 | 5/2002 | Hoffmann et al. |
| 2002/0065083 A1 | 5/2002 | Patel |
| 2002/0071396 A1* | 6/2002 | Lee et al. .................... 370/252 |
| 2002/0075824 A1 | 6/2002 | Willekes et al. |
| 2002/0085514 A1 | 7/2002 | Illidge et al. |
| 2002/0085568 A1* | 7/2002 | Oommen .................... 370/401 |
| 2002/0089951 A1* | 7/2002 | Hyun et al. ................. 370/335 |
| 2002/0105926 A1 | 8/2002 | Famolari et al. |
| 2002/0105935 A1 | 8/2002 | Miya |
| 2002/0107593 A1* | 8/2002 | Rabipour et al. ............. 700/94 |
| 2002/0156921 A1* | 10/2002 | Dutta et al. ................. 709/246 |
| 2002/0186845 A1* | 12/2002 | Dutta et al. ................. 380/247 |
| 2002/0191561 A1* | 12/2002 | Chen et al. .................. 370/331 |
| 2003/0026289 A1* | 2/2003 | Mukherjee et al. .......... 370/466 |
| 2003/0169727 A1* | 9/2003 | Curry et al. ................. 370/352 |
| 2004/0219914 A1* | 11/2004 | Patel ....................... 455/432.3 |

OTHER PUBLICATIONS

Lee, D.J.Y. et al., "Integrating Global Wireless Systems with IP," IEEE (Sep. 23-28, 2000).

McCann, Peter J. et al., "An Internet Infrastructure for Cellular CDMA Networks Using Mobile IP," IEEE Personal Communications (Aug. 2000).

International Search Report—PCT/US02/021042, International Search Authority—ISA/US—Dec. 19, 2002.

International Preliminary Examination Report—PCT/US02/021042, International Search Authority—IPEA/US—Apr. 30, 2003.

* cited by examiner

SYSTEM AND METHOD FOR VOICE OVER IP

FIELD OF THE INVENTION

The present invention relates generally to enabling a wireless telephone that is not required or generally configured to support voice over Internet Protocols (VOIP) to nonetheless communicate with wireless telephone infrastructure that uses IP structures or architectures, with IP-based communication between the wireless telephone infrastructure and any VOIP-based infrastructure being supported.

BACKGROUND OF THE INVENTION

Wireless telephones, such as but not limited to wireless telephones that communicate using Code Division Multiple Access (CDMA) spread spectrum modulation techniques, communicate over the air with system infrastructure using wireless telephone over-the-air communication protocols, e.g., the CDMA protocols known as IS-95A, IS-95B, and IS-2000. The system infrastructure, which can include base stations (BTS), base station controllers (BSC), and other components, connects the wireless telephone to another communication device, such as a through land line or another wireless communication system.

In the case of CDMA, voice data is sent over the air in packets that are collected by the infrastructure and assembled into a voice stream, transparently to the speakers who are talking to each other. As might be expected, the over-the-air protocol is tailored to optimize wireless communication. For instance, to maximize over-the-air capacity, the over-the-air protocol contains a minimum of signalling information, and the size of a voice data packet is relatively small.

With the growth of the Internet, computer-to-computer communication using Internet Protocols (IP) has become ubiquitous. Furthermore, it has become desirable not only to facilitate computer data communication using IP, but to facilitate voice communication using IP as well. As but one advantage afforded by using IP in a telephony infrastructure, much hardware such as switches can be eliminated, and existing computers and software can be used instead, reducing cost. To this end, so-called voice over IP (VOIP) has been introduced.

To support VOIP, a communication device must have, among other requirements, IP capability, i.e., the device must itself be able to communicate using IP, and it must have an IP address.

The present invention critically observes, however, that requiring a wireless telephone to use VOIP diminishes over-the-air capacity because VOIP is not necessarily designed to maximize such capacity. Instead, VOIP accounts for design considerations that are not necessarily related to wireless telephony. As an example, the data packet size of VOIP is relatively large, compared to the packet size used throughout the wireless communication industry such as in wireless telephones using over-the-air protocols such as IS-95. Indeed, a typical packet size in the IS-95 protocol is less than the size of a single packet header employed in a typical IP. Moreover, configuring a wireless telephone to communicate using both IP and over-the-air protocols complicates telephone design, adversely strains available resources (e.g., power, computing cycles, coding, and so on), and increases costs.

Nonetheless, the present invention understands that it would be desirable to enable wireless telephone communication using an infrastructure that transmits data in accordance with IP principles. With the above considerations in mind, the present invention provides the solutions disclosed below.

SUMMARY OF THE INVENTION

A voice over Internet (VOIP) system includes an infrastructure component communicating with plural wireless communication devices, such as but not limited to telephones, using a wireless telephone over-the-air protocol that is different from the Internet Protocol (IP). The infrastructure component includes a logic component that facilitates communication between a target wireless telephone and another communication device. As contemplated herein, the infrastructure component is essentially a virtual IP endpoint such that the target wireless telephone is not required and might not be internally configured to support IP, or any other VOIP-related protocols such as but not limited to VDP, TCP, and RTP. The logic includes transforming information in IP protocols to one or more wireless protocol, and sending the information in wireless protocol to the target wireless telephone. Also, the logic includes transforming information in wireless telephone protocol from the target wireless telephone to IP protocol, and sending the information in IP protocol toward the communication device.

In a preferred embodiment, the wireless telephone protocol is an over the air (OTA) voice or data protocol such as a code division multiple access (CDMA)-related protocol, and the infrastructure component is a base station (BTS). Or, the infrastructure component can be a base station controller (BSC) or other selected component of the infrastructure, or a gateway for a satellite communication system, and so on. In any case, the logic component converts OTA protocol voice packets to IP packets including but not limited to packets in multiple protocol layers or stacks to accomplish communication tasks, handshaking, coding, and so on. The logic component also converts IP packets to OTA protocol packets. An OTA protocol voice packet can have a size less than the size of an IP packet.

As recognized herein, the above-summarized invention avoids so-called tandem vocoding in wireless-to-wireless calls in prior art systems, thus facilitating faster (less latent) and higher quality communication. Specifically, the present invention avoids the process of conventional wireless systems, wherein the wireless telephone compresses ("vocodes") voice information and then transmits the compressed information, which is decompressed ("devocoded") at a base station controller (BSC), sent through a telephony infrastructure, and then recompressed in the infrastructure prior to transmission to a recipient wireless telephone, which eventually devocodes the information and displays it as voice data. The tandem vocoding (both at the wireless endpoints and within the infrastructure) results in lost information, thus decreasing communication quality. It also results in increased latency. In the present invention, in contrast, the vocoded information received at the virtual IP endpoint is not decompressed, but rather is sent through the infrastructure in IP to another endpoint, where it is converted to OTA protocol and sent to a recipient wireless device for a single devocoding operation. Thus, the present infrastructure advantageously need not undertake vocoding or devocoding.

Accordingly, in another aspect a communication system can include first and second wireless endpoints and an infrastructure supporting IP. The infrastructure includes a first virtual IP endpoint communicating with the first wireless endpoint such that the first virtual IP endpoint receives information from the first wireless endpoint and sends the information through the infrastructure to the second IP endpoint for transmission therefrom to the second wireless endpoint. No compression or decompression of the information is undertaken by the infrastructure.

In another aspect, a method for communicating information in IP to a wireless telephone that does not support IP includes transforming the information in IP to an over-the-air (OTA) protocol, and transmitting the information in OTA protocol to the wireless telephone.

In still another aspect, a computer program product includes logic means for converting information in IP from a communication system infrastructure to information in over-the-air (OTA) protocol packets to render first converted packets. Logic means convert information in OTA protocol packets from a wireless telephone to IP packets to render second converted packets, with logic means providing communication between the wireless telephone and the infrastructure using the first and second converted packets.

In yet another aspect, a telephone system includes a wireless endpoint in the system and an infrastructure supporting IP. As disclosed in greater detail below, the infrastructure includes a virtual IP endpoint that communicates with the wireless endpoint. The virtual IP endpoint receives information having an IP address allocated to the virtual IP endpoint and intended for receipt by the wireless endpoint. The virtual IP endpoint then provides the information to the wireless endpoint.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
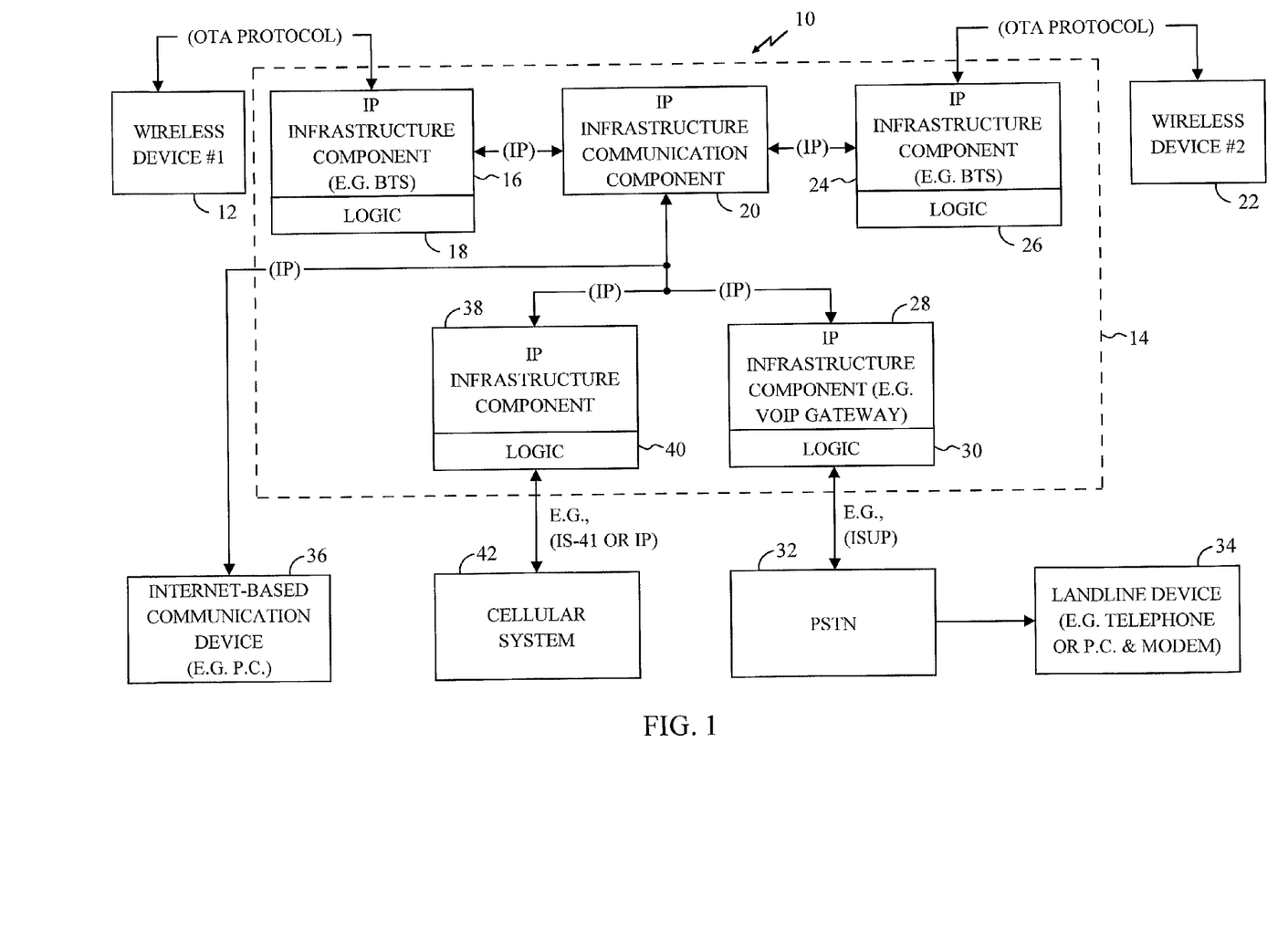
FIG. 1 is a block diagram of a presently preferred inventive wireless communication system.

Referring initially to FIG. 1, a system is shown, generally designated 10, for effecting communication between a target wireless communication device 12 that does not support voice over Internet Protocols (VOIP) and a telephony infrastructure 14 that supports IP. By "does not support VOIP" or "does not support IP" is meant that the device 12 either has no IP or VOIP capability, or that it has such capability but for improved performance uses a standard over the air (OTA) protocol such as a spread spectrum scheme like CDMA or WCDMA or other wireless protocol such as but not limited to TDMA, UPMS, TD-SCDMA, etc. to communicate with the infrastructure 14. In one non-limiting embodiment the device 12 is a mobile telephone made by Kyocera, Samsung, or other manufacturer that uses Code Division Multiple Access (CDMA) principles and CDMA over-the-air (OTA) communication air interface protocols such as defined in but not limited to IS-95A, IS-95B, UCDMA, IS-2000, and others to communicate with the infrastructure 14.

For instance, the wireless communication systems to which the present invention can apply, in amplification to those noted above, include Personal Communications Service (PCS) and cellular systems, such as Analog Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-98. Other communications systems are described in the International Mobile Telecommunications System 2000/Universal Mobile Telecommunications Systems (IMT-2000/UM), standards covering what are referred to as wideband CDMA (WCDMA), cdma2000 (such as cdma2000 1× or 3× standards, for example) or TD-SCDMA.

The present invention applies to any wireless communication device 12; for illustration it will be assumed that the device 12 is a telephone 12. In general, wireless communication devices to which the present invention applies may include but are not limited to a wireless handset or telephone, a cellular phone, a data transceiver, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

As shown in FIG. 1, the wireless telephone 12 communicates, using one or more of the above-mentioned systems, with at least one first infrastructure component 16 that accesses a logic module 18 to execute the logic of the present invention. The first component 16 preferably is a base station (BTS), but it can also be implemented by base station controller (BSC), mobile switching center (MSC), gateway to a satellite system, or other infrastructure component. In any case, the first component 16 not only supports the necessary protocols and systems to communicate with the wireless device 12, but also supports IP and attendant protocols or stack of IP protocols, and accordingly communicates with a coordinating infrastructure component 20 such as a BSC or another BTS using IP. In turn, when the target wireless telephone 12 is to communicate with a second wireless telephone 22 in the same infrastructure 14 system, the coordinating component 20 communicates via IP with a second infrastructure component 24 such as a second BTS, which in turn executes a logic module 26 to communicate, using OTA protocol, with the second wireless telephone 22.

The infrastructure components 16, 24 thus communicate with their respective wireless telephones 12, 22 using OTA protocol but communicate internally to the infrastructure 14 using IP, thereby relieving the wireless telephones 12, 22 from having to support IP and attendant suite of voice over Internet protocols or from having to support any processing, use of resources, etc. related to implementing IP. Also, by using IP internally to the infrastructure 14 and OTA protocol between the telephones 12, 22 and the respective components 16, 24, the advantages of using IP internal to the infrastructure 14 are realized, whereas the advantages of OTA protocol in wireless communication to the telephones 12, 22 are preserved to maximize the over-the-air capacity of the system 10. Accordingly, the infrastructure components 16, 24 can be thought of as virtual IP endpoints, with the actual communication endpoints being the telephones 12, 22.

FIG. 1 further shows that the target wireless telephone 12 can also communicate with communication devices outside of the infrastructure 14. Specifically, the infrastructure 14 can include a VOIP gateway 28 with logic module 30 for communicating, in accordance with principles known in the art, with the coordinating infrastructure component 20 and with a public switch telephone network (PSTN) 32. The communication between the coordinating component 20 and the VOIP gateway 28 can be via IP, whereas the communication between the VOIP gateway 28 and the PSTN 32 can be via a signalling protocol such as ISUP using a physical system such as the system known as SS7. In turn, the PSTN includes one or more landline devices 34 such as telephones or modems, to complete the communication pathway between the target wireless telephone 12 and the landline devices 34.

Additionally, the target wireless telephone 12 can communicate with an Internet-based communication device 36 such as a personal computer (PC), data server, intranet portal, or other computer. The Internet-based device 36 communicates with the coordinating infrastructure component 20 using IP.

Still further, the infrastructure 14 can include an interface component 38 with logic module 40 for communicating with the coordinating component 20 within the infrastructure 14 and with wireless communication systems 42 that are outside of the infrastructure 14. For example, the interface component 38 can be a mobile switching center (MSC) or gateway. Communication between the interface component 38 and coordinating component 20 can use IP, whereas communication between the interface component 38 and the other wireless/cellular systems 42 can use IS-41 protocol or IP.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by a processor within, e.g., the infrastructure component 16 as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

Figure 2:
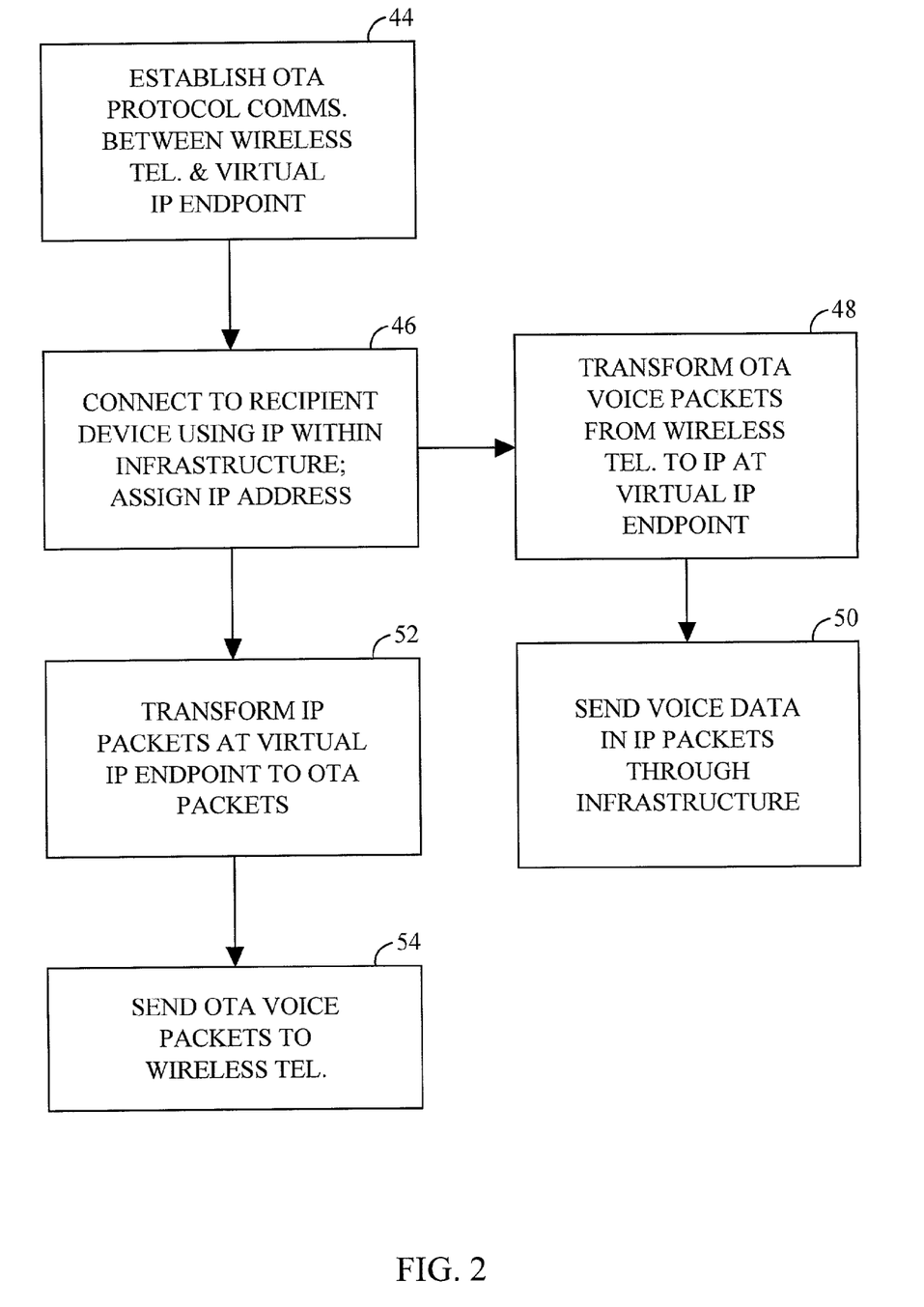
FIG. 2 is a flow chart of the logic for communicating with a non-IP-based wireless device using an IP-enabled infrastructure when the wireless device establishes and maintains the call.

Now referring to FIG. 2, the logic that is executed when the target wireless telephone 12 places a call is shown. Commencing at step 44, communication using an appropriate over-the-air (OTA) protocol is established between the telephone 12 and the first component 16, i.e., between the telephone 12 and the virtual IP endpoint of the present invention. In one exemplary, non-limiting embodiment, the process at step 44 can include receiving a CDMA protocol origination message from the telephone 12 in, for example, IS-95 protocol, and then in response essentially transforming the origination message to IP by sending an IP-based Session Initiation Protocol (SIP) messages from the first component 16 to other appropriate server components within the infrastructure 14 in accordance with principles known in the art. These SIP messages can ascertain the location of the telephone 12 and establish communications with the intended recipient's endpoint. In the case wherein the recipient is the second wireless telephone 22, IP communication is established between the virtual endpoints which are established by the components 16, 24.

Proceeding to step 46, the infrastructure 14 connects to the recipient device using the above-disclosed IP messaging in the infrastructure 14. In the case of the second wireless telephone 22 being the recipient, the second component 24 establishes communication with the telephone 22 using OTA protocol messages. In contrast, when the recipient is the Internet-based communication device 36, IP communication is established in accordance with principles known in the art between the device 36 and the infrastructure 14. On the other hand, when the recipient is the cellular system 42, communication is established between the infrastructure 14 and the system 42 using IP or other protocol known in the art, e.g., IS-41. Still further, when the landline 34 is contacted, communication is established between the infrastructure 14 and the PSTN 32 using a protocol known in the art, such as ISUP. Also, as indicated in FIG. 2 an IP address is assigned to the telephone 12. The details of how IP addresses are assigned are discussed further below in reference to FIGS. 4 and 5.

Once communication is established, the processing can perform parallel tasks steps 48 and 52. At step 48, OTA packets such as OTA voice packets from the wireless telephone 12 are transformed or otherwise converted to IP at the virtual IP endpoint, i.e., the first component 16. To make this transformation, the contents of the OTA voice packets are rearranged as appropriate to conform to IP packet requirements. Typically, since OTA voice packets are smaller than IP packets and frequently are smaller than the headers of IP packets, several OTA packets might be combined into a single IP packet, although this might not necessarily be the case particularly for latency intensive applications. The information in IP, which can represent voice, digital data, digitized image data, or other type of data is sent through the infrastructure 14 toward the recipient at step 52.

Likewise, at step 52 IP packets representing information that originated at the recipient device move through the infrastructure 14 and are converted to OTA packets by the first component 16, i.e., by the virtual IP endpoint. The OTA packets are sent to the telephone 12 at step 54. The transformation from IP to OTA protocol is the reverse of the process for converting OTA packets to IP packets, i.e., each IP packet might be separated into a set of smaller OTA packets as appropriate to conform to the OTA protocol used by the telephone 12.

Figure 3:
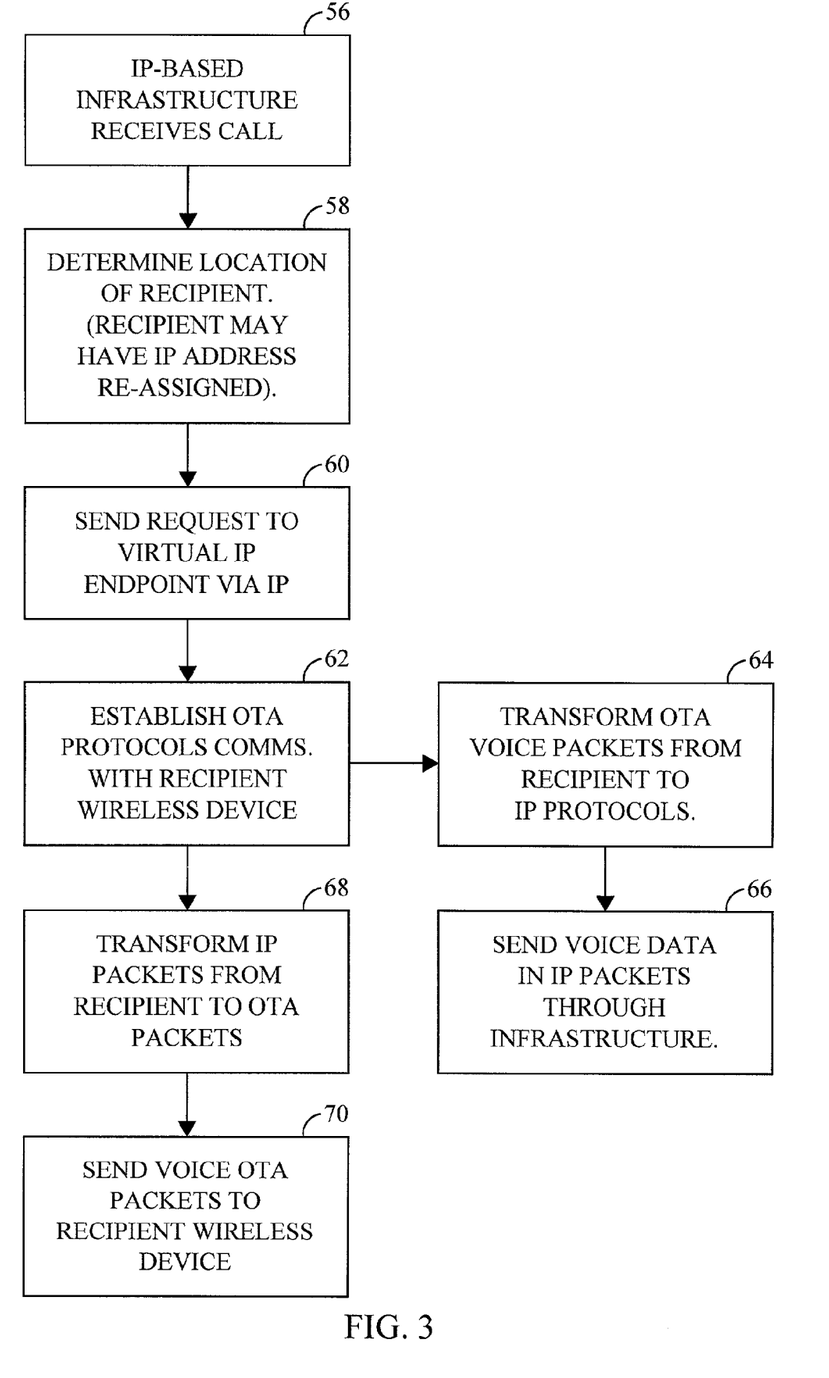
FIG. 3 is a flow chart of the logic for communicating with a non-IP wireless telephone using an IP-enabled infrastructure when the wireless telephone is called.

FIG. 3 shows the logic that is invoked when the telephone 12 is contacted. Commencing at step 56, the infrastructure receives a call request for the telephone 12. At step 58, the location of the telephone 12 is determined in accordance with locating principles known in the art, e.g., global positioning satellite or known network techniques. Typically, the location is established by the telephone 12 being detected by one or more base stations, with the closest detecting base station location being known. The call request is sent to the virtual IP endpoint (i.e., the first component 16) via IP at step 60.

Moving to step 62, OTA protocol communications are established with the telephone 12. Then, OTA protocol packets from the telephone 12 are transformed to IP and sent through the infrastructure 14 at steps 64 and 66 in accordance with principles discussed above. Also, IP packets representing information intended for the telephone 12 are converted to OTA protocol packets and sent over the air to the telephone 12 at steps 68 and 70 in accordance with principles discussed above.

Figure 4:
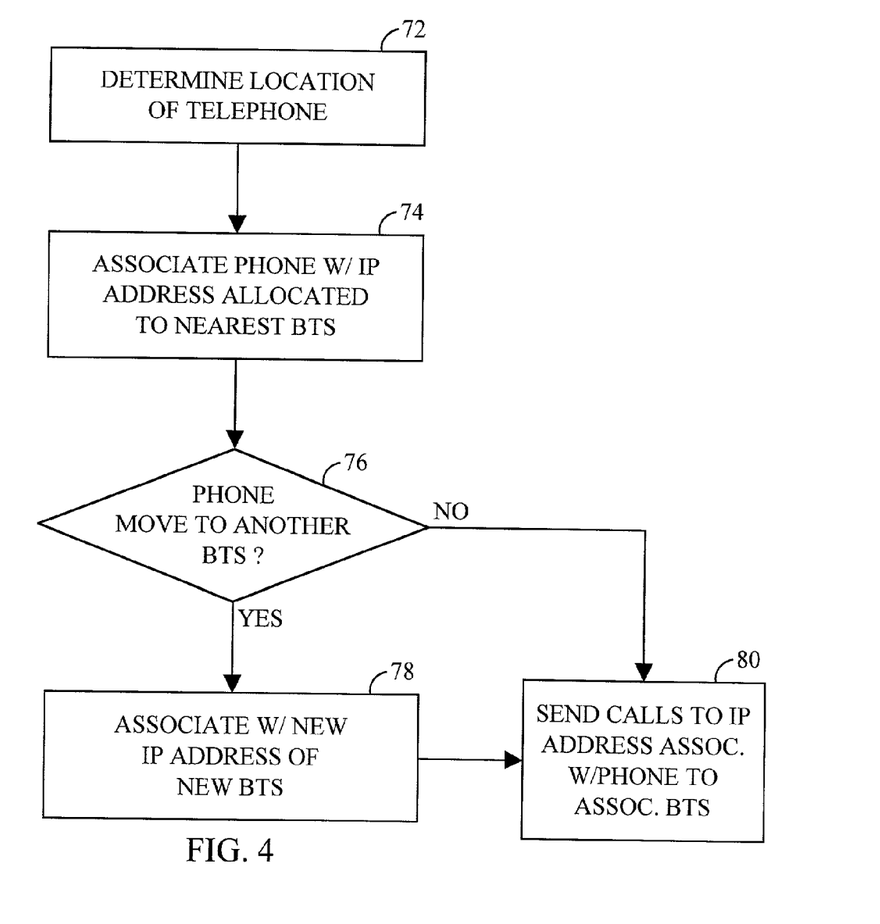
FIG. 4 is a flow chart of a first method for assigning an IP address to a wireless telephone.

FIG. 4 shows one method for paging the telephone 12 by assigning a temporary IP address to the telephone 12. By "paging" generally is meant "contacting" or "periodically establishing a connection". Commencing at step 72, the location of the telephone is determined in accordance with principles known in the art. Moving to step 74, an IP address that has been allocated to the receiving virtual IP endpoint (e.g., to the BTS closest to the telephone 12) is associated with the telephone 12. This address is recorded in the infrastructure 14 in, e.g., table lookup form, as being the address of the telephone 12. By "IP address" is meant an address useful in identifying intended recipients of IP packets. This can include a conventional IP address numeric string and/or an alpha-numeric address associated with the string. In one non-limiting example, the alpha-numeric address can be the telephone number of the telephone 12 with an IP identifier appended thereto, e.g., 5551212@qualcomm.com. More generally, the IP address can include a wireless device identification such as an electronic serial number.

Next, if it is determined at step 76 that the telephone 12 has moved into the area of another BTS, the process proceeds to step 78 to associate an IP address allocated to the new BTS with the telephone 12. In any case, when a call is received for the telephone 12 the process proceeds to step 80 to page the telephone 12. A page message may include the contents conventionally delivered to BTS by MSC when paging a cellular device using existing cellular infrastructure protocols. These contents may include the destination wireless telephone 12 identifier and details regarding the desired communication. The BTS may subsequently transmit OTA page messages to the telephone 12.

Once the telephone 12 answers the page, communication is established as set forth above, using the temporary IP address of the telephone 12 to route IP information through the infrastructure 14. That is, information intended for the telephone 12 is associated with the IP address of the telephone 12, and then sent to the virtual IP endpoint for conversion thereof to OTA protocol and transmission to the telephone 12.

Figure 5:
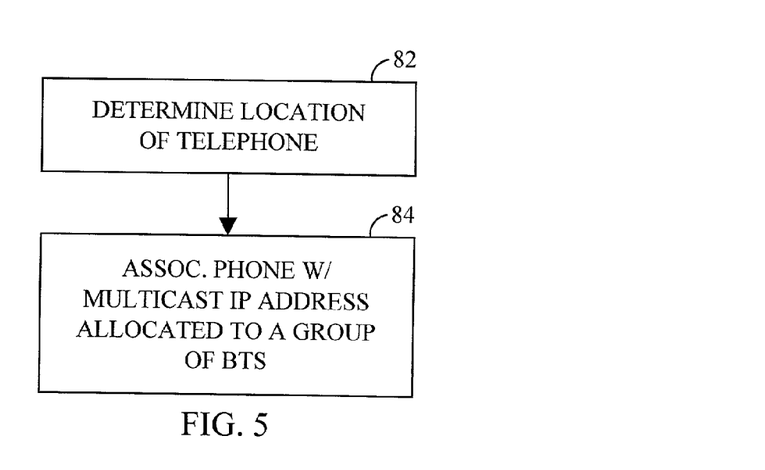
FIG. 5 is a flow chart of a second method for assigning an IP address to a wireless telephone.

While the logic of FIG. 4 provides for highly efficient paging process, FIG. 5 shows a method for minimizing the assignment of temporary IP addresses to wireless telephones in the system 10 and, hence, to minimize the number of messages that must be used for assigning IP addressed to wireless telephones. Commencing at step 82, the location of the wireless telephone 12 is determined. Proceeding to step 84, the telephone 12 is associated with an IP address that is a multicast address allocated to more than one virtual IP endpoint, e.g., that is an address allocated to a group of BTS or other such component. In this embodiment, the page message is transmitted to the multicast IP address associated with the telephone 12, i.e., is transmitted to each BTS in the multicast group. The virtual IP endpoints in the multicast group then transmit OTA pages to the wireless telephone 12, and communication is established between the infrastructure 14 and the wireless telephone 12.

Because the contents of the page message sent to the multicast address specifies the target wireless telephone 12, a single IP multicast address can be associated with multiple wireless telephones, thereby simplifying tracking requirements on the system 10.

While the particular SYSTEM AND METHOD FOR VOICE OVER IP as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A voice over Internet (VOIP) system, comprising:
    at least one infrastructure component communicating with one or more wireless devices using a wireless device over-the-air (OTA) protocol different from Internet protocol (IP), the infrastructure component including:
        at least one logic component facilitating communication between a target wireless device and a communication device, the target wireless device not supporting IP, the logic component being configured to:
        receive communication device-generated voice data in IP protocol, wherein the voice data in IP protocol is received by the infrastructure component based on an IP address allocated from the infrastructure component and temporarily assigned to the target wireless device based on the location of the target wireless device, wherein the infrastructure component functions as a virtual IP endpoint for the target wireless device;
        transform the voice data in IP protocol to the wireless device OTA protocol without vocoding the voice data;
        send the voice data in the wireless device OTA protocol to the target wireless device;
        transform voice data in the wireless device OTA protocol received from the target wireless device to IP protocol without devocoding the voice data; and
        send the voice data in IP protocol toward the communication device.

2. The system of claim 1, wherein the wireless device OTA protocol is a code division multiple access (CDMA) air interface protocol.

3. The system of claim 1, wherein the infrastructure component is a base station (BTS).

4. The system of claim 1, wherein the infrastructure component is a base station controller (BSC).

5. The system of claim 1, wherein the wireless device OTA protocol is an over-the-air (OTA) voice protocol.

6. The system of claim 1, wherein the logic component converts OTA protocol packets to IP packets.

7. The system of claim 1, wherein the logic component converts IP packets to OTA protocol packets.

8. The system of claim 1, wherein the wireless device OTA protocol is a spread spectrum protocol.

9. The system of claim 1, wherein the infrastructure component is a gateway for a satellite communication system.

10. The system of claim 1, wherein the voice data represents digitized voice, or digital data.

11. The system of claim 5, wherein the wireless device OTA protocol is a protocol selected from the group of protocols consisting of: CDMA, WCDMA, TDMA, TD-SCDMA, UMTS.

12. The system of claim 6, wherein the logic component converts IP packets to OTA protocol packets.

13. The system of claim 6, wherein an OTA protocol voice packet has a size less than the size of an IP packet.

14. A method for communicating voice data in IP to a wireless device not supporting Internet protocol (IP), comprising:
   determining a location of the wireless device;
   temporarily associating a first IP address with the wireless device based at least in part on the location of the wireless device, wherein the first IP address is allocated from a first infrastructure component communicating with the wireless device, and wherein the first infrastructure component functions as a virtual IP endpoint for the wireless device;
   receiving, at the first infrastructure component from which the first IP address is allocated, communication device-generated voice data in IP protocol;
   transforming, at the first infrastructure component, the voice data in IP protocol to an over-the-air (OTA) protocol different from IP protocol without vocoding the voice data;
   transmitting the voice data in the OTA protocol to the wireless device;
   transforming, at the first infrastructure component, voice data in the OTA protocol received from the wireless device to IP protocol without devocoding the voice data; and
   sending the voice data in IP protocol toward the communication device.

15. The method of claim 14, wherein the method is undertaken by a one or more communication system infrastructure components.

16. The method of claim 15, wherein the infrastructure components are base stations (BTSs).

17. The method of claim 15, wherein the infrastructure components are base station controllers (BSCs).

18. The method of claim 15, wherein the first infrastructure component is a gateway for a satellite communication system.

19. The method of claim 14, wherein the OTA protocol is a CDMA protocol.

20. The method of claim 14, comprising converting OTA protocol packets to IP packets.

21. The method of claim 14, comprising converting IP packets to OTA protocol packets.

22. The method of claim 14, wherein the OTA protocol is a CDMA voice protocol.

23. The method of claim 14, wherein an OTA protocol voice packet has a sizeless than the size of an IP packet.

24. The method of claim 14, wherein the wireless device OTA protocol is a protocol selected from the group of protocols consisting of: CDMA, WCDMA, TDMA, TD-SCDMA, UMTS.

25. The method of claim 14, wherein the wireless device is a first wireless device and the first wireless device communicates with a second wireless device in a call.

26. The method of claim 14, Wherein determining a location of the wireless, device; further comprises continually determining the location of the wireless device during a voice call and associating second IP address with the wireless device based at least in part on movement of the wireless device during the voice call.

27. The method of claim 14, further comprising:
   determining that the wireless device has moved to a location supported by a second infrastructure component;
   associating a second IP address with the wireless device allocated from the second infrastructure component;
   receiving, at the second infrastructure, the communication device-generated voice data in IP protocol;
   transforming, at the second infrastructure component, the voice data in IP protocol to the OTA protocol; and
   transmitting the voice data in the OTA protocol to the wireless device.

28. At least one computer program product, comprising:
   a computer-readable medium embodying a computer program including:
      codes for causing a computer to determine a location of a wireless device that does not support IP;
      codes for causing the computer to temporarily associate a first IP address with the wireless device based at least in part on the location of the wireless device, wherein the first IP address is allocated from a first infrastructure component communicating with the wireless device, and wherein the first infrastructure component functions as a virtual IP endpoint for the wireless device;
      codes for causing the computer to receive at the first infrastructure component from which the first IP address is allocated, communication device-generatedvoice data in IP protocol communicated;
      codes for causing the computer to convert, at the first infrastructure component, the voice data in Internet protocol (IP) to voice data in over-the-air (OTA) protocol packets, without vocoding the voice data, to render first converted packets, wherein the OTA protocol is different from IP and supported by the wireless device;
      codes for causing the computer to convert voice data in OTA protocol packets from the wireless device not supporting IP to IP packets, without devocoding the voice data, to render second converted packets; and
      codes for causing the computer to provide communication between the wireless device and the infrastructure component using the first and second converted packets.

29. The product of claim 28, wherein a first converted packet has a size smaller than a second converted packet.

30. The product of claim 29, wherein a first converted packet has a size smaller than a header of a second converted packet.

31. The product of claim 28, wherein the OTA protocol is a CDMA protocol.

32. The product of claim 28, wherein the computer is a base station or a base station controller.

33. The product of claim 28, further comprising
codes for causing a computer to determine that the wireless-device has moved to a location supported by a second infrastructure component;
codes for causing the computer to associate a second IP address with the wireless device allocated from the second infrastructure component;
codes for causing the computer to receive, at the second infrastructure, the communication device-generated voice data in IP protocol;
codes for causing the computer to transform, at the second infrastructure component, the voice data IP protocol to the OTA protocol; and
codes for causing the computer to transmit the voice data in the OTA protocol to the wireless device.

34. A voice over Internet (VOIP) system, comprising:
at least one infrastructure component communicating with one or more wireless devices using a wireless device over-the-air (OTA) protocol different from Internet protocol (IP);
at least one wireless communication device communicating with the infrastructure, the wireless communication device not supporting IP;
wherein the wireless communication device is a target wireless device and is temporarily assigned with an IP address that is allocated from the infrastructure component based on the location of the wireless communication device, wherein the infrastructure component functions as a virtual IP endpoint for the target wireless device; and
wherein the infrastructure component includes at least one logic component facilitating communication between the target wireless device and another communication device, the target wireless device not supporting IP, the logic component being configured to
receive, at the infrastructure component, voice data in IP protocol from the communication device based on the IP address;
transform voice data in IP protocol to the wireless device OTA protocol without vocoding the voice data;
send the voice data in wireless device OTA protocol to the target wireless device;
transform voice data in wireless device OTA protocol from the target wireless device to IP protocol without devocoding the voice data; and
send the voice data in IP protocol toward the other communication device.

35. The system of claim 34, wherein the wireless device OTA protocol is a code division multiple access (CDMA) air interface protocol.

36. The system of claim 34, wherein the infrastructure component is a base station (BTS).

37. The system of claim 34, wherein the infrastructure component is a base station controller (BSC).

38. The system of claim 37, wherein the wireless device OTA protocol is a spread spectrum protocol.

39. The system of claim 34, wherein the infrastructure component is a gateway for a satellite communication system.

40. The system of claim 39, wherein the logic component converts if packets to OTA protocol packets.

41. The system of claim 39, wherein an OTA protocol voice packet has a size less than the size of an IP packet.

42. The system of claim 34, wherein the wireless device OTA protocol is an over-the-air (OTA) voice protocol.

43. The system of claim 34, wherein the logic, component converts OTA protocol packets to IP packets.

44. The system of claim 34, wherein the logic component converts IP packets to OTA protocol packets.

45. The system of claim 34, wherein the IP address assigned to the wireless device can change during a voice call based on the wireless device changing location during the voice call.

* * * * *

UNITED STATES PATENT AND TRADEMARK OFFICE
CERTIFICATE OF CORRECTION

PATENT NO. : 7,590,143 B2
APPLICATION NO. : 09/900559
DATED : September 15, 2009
INVENTOR(S) : Daley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1534 days.

Signed and Sealed this

Twenty-first Day of September, 2010

David J. Kappos
*Director of the United States Patent and Trademark Office*